Jan. 1, 1963 R. B. CLARK 3,071,636
THERMOCOUPLE
Filed April 18, 1960
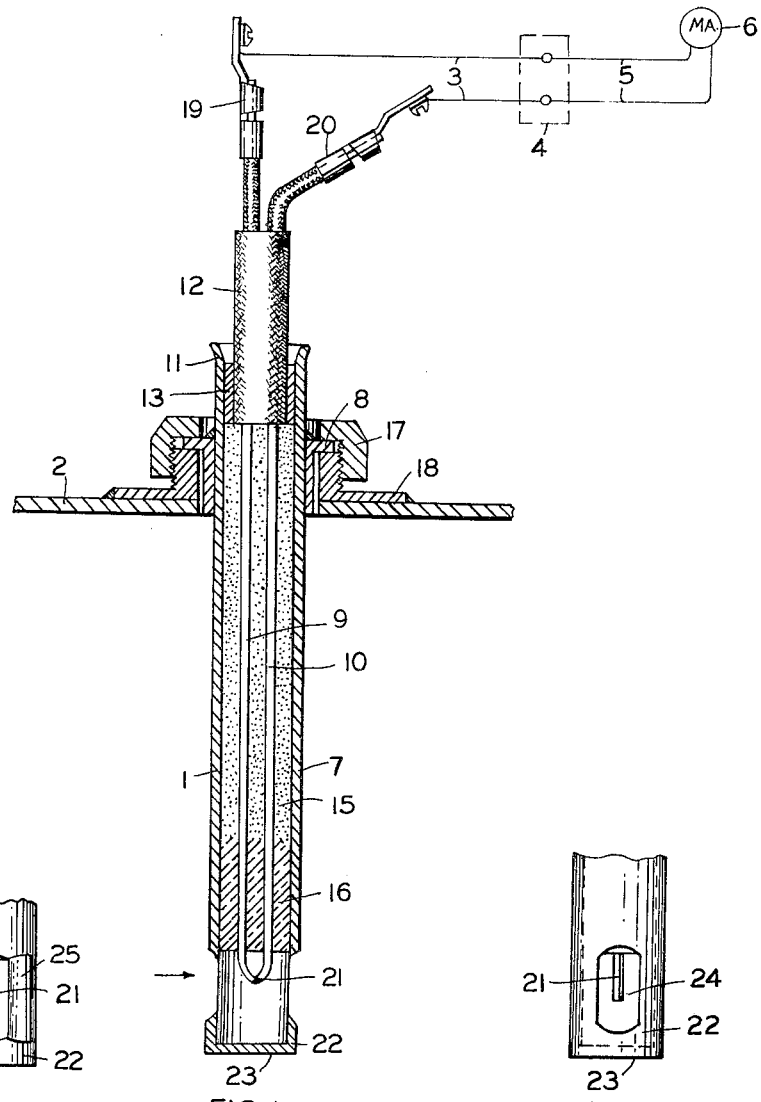
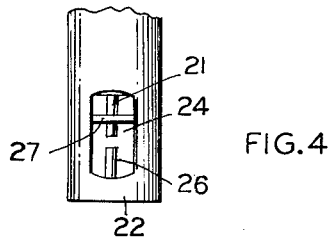
*INVENTOR.*
ROBERT B. CLARK
BY
Irving M. Freedman
HIS ATTORNEY United States Patent Office 3,071,636
Patented Jan. 1, 1963

3,071,636
THERMOCOUPLE
Robert B. Clark, Marblehead, Mass., assignor to General Electric Company, a corporation of New York
Filed Apr. 18, 1960, Ser. No. 22,896
7 Claims. (Cl. 136—4)

This invention relates to thermocouples and more particularly to an improved construction for protecting thermocouple junctions against mechanical damage while maintaining or increasing the speed of response thereof to temperature changes.

Thermocouples are often placed in a gas stream to sense or measure the temperature of the stream for indication and control purposes. Thermocouples are commonly utilized in the exhaust stream of gas turbine engines to sense the temperature of the exhaust gas in order to control the fuel flow to the engine or to control the exhaust nozzle area to prevent engine temperatures from exceeding certain critical values. The changes in temperature of the jet exhaust stream can be very rapid and engine temperatures which exceed the critical values for even a short period of operation can quickly burn out or destroy operating parts of the engine. The thermocouple in order to protect the engine must sense and indicate such temperature changes quickly.

The operating conditions encountered in jet exhaust streams are severe since both the velocity and temperature of the stream as very high. Frequently, solids, particles or masses are picked up by the suction at the compressor inlet which could cause breakage of the thermocouple junction. Also, the rather delicate thermocouple junction may be damaged by maintenance personnel while working on the engine. Although efforts can be made to filter the air intake to the engines, a certain amount of debris will still pass through the engine and cause erosion and possible breakage of the thermocouple exposed to the stream, particularly the thermocouple junction.

Therefore, it is important that the thermocouple junction be protected against such conditions as much as possible. However, thermocouples in the jet exhaust stream must exhibit a fast speed of response so that even rapid changes in temperature are accurately and quickly detected and the presence of high temperatures communicated to the control devices to maintain the engine operating temperature within the critical range.

In the past it has been thought undesirable to provide a protective housing around a thermocouple junction when a rapid response is required since the protective housing necessarily adds thermal mass to the region around the thermocouple and tends to reduce the flow of gases past the thermocouple junction, thus reducing its ability to indicate rapid changes in temperature quickly enough to enable effective corrective control action. The housing also tends to isolate the thermocouple from rapid changes in the temperature of the jet exhaust stream.

It is an important object of the present invention to provide an improved thermocouple in which the thermocouple junction is protected without decreasing the speed of response thereof.

Another object of the invention is to provide an improved thermocouple having a protected junction while at the same time providing am improved speed of response thereof.

Still another object of the invention is to provide an improved thermocouple sheath which may be readily manufactured and which improves the operating characteristics of the thermocouple.

Yet another object of the invention is to provide a thermocouple body that readily lends itself to performance checking by the type of equipment currently being used for such purposes.

Other objects and advantages of the invention will become apparent as the following description proceeds and the features of novelty which characterize the invention will be pointed out with particularity in the claims annexed to and forming a part of this specification.

In accordance with one form of the invention, the cylindrical housing or sheath of the thermocouple extends beyond the thermocouple junction which protrudes from the insulating and supporting mass which surrounds the thermocouple leads. An enclosure about the thermocouple junction is formed by the sheath extension and an end closure. A pair of diametrically opposed openings are provided in the sheath extension to allow the gas stream to pass through the enclosure and past the thermocouple junction. The turbulence provided to the gas flow by the leading edges of the upstream opening, breaks up the boundary layer of air surrounding the thermocouple junction and increases the speed of response thereof.

More particularly, the sheath surrounding the diametrically opposed openings may be fabricated to provide a funneling arrangement to increase the mass of gas flow into the enclosure and past the junction. Also, one or more strips may be placed across the upstream opening to further screen out impurities in the gas stream and increase the gas stream turbulence in the region of the thermocouple junction.

For a better understanding of this invention, reference may be had to the following description taken in connection with the accompanying drawing in which:

FIG. 1 is a cross-sectional view showing a thermocouple including one embodiment of the present invention, the thermocouple being shown schematically connected to an indicating circuit;

FIG. 2 is an enlarged fragmentary showing of that portion of the thermocouple shown in FIG. 1 which includes the parts associated with the thermocouple junction;

FIG. 3 illustrates an alternate embodiment of the invention; and,

FIG. 4 illustrates yet another alternate embodiment of the invention.

Referring to FIGS. 1 and 2, the thermocouple assembly, including the cylindrical housing or shell 1, is installed by mounting it through an aperture in a housing wall 2 of a gas turbine power plant or any other chamber confining a fluid or gas flow which is to be measured. The thermocouple output is provided across a pair of conductors 3 which are connected at a reference junction 4 through leads 5 to a milliammeter or other indicating or control initiating device 6.

The thermocouple assembly 1 has a tubular housing or sheath 7 made of stainless steel or other suitable metal to which is externally attached a metallic mounting flange 8, the flange being preferably welded or brazed to the housing in order to restrict gas leakage. Extending through the bore of the sheath 7 is a pair of thermocouple conductors or leads 9 and 10 of dissimilar metals which are electrically connected through conductors of corresponding metals in a cable or lead 12 having an insulating cover of suitable material.

The terminal end of the housing 7 may be outwardly flared, as shown at 11, to protect the insulated thermocouple cable 12 from sharp edges on the housing end. To connect the thermocouple cable 12 to the housing 7, a bushing 13 made of brass or other malleable metal is provided, the external diameter of the bushing being the same as or slightly larger than the internal diameter of the housing 7 so that a very tight fit is provided when the bushing is inserted in the terminal end of the housing beyond the flare 11. The internal diameter of the bushing is slightly smaller than the cable diameter so that it grips the thermocouple cable 12 firmly without cutting its insulating cover.

The thermocouple conductors are insulated from each other and from the housing walls by a suitable insulating core, frequently consisting of a powdered insulant 15 which may comprise MgO or $Al_2O_3$.

Alternatively, the leads may be of the swaged or ceramic bead type. The details of construction of the terminal end of housing 7 and the leads associated therewith may be of any suitable construction and do not constitute part of the subject invention.

In order to prevent the powdered core material from flaking off or decomposing at the junction end of the thermocouple housing, a confining means such as core plug 16 may be utilized to seal the junction end. The insulating powder and core plug may be fabricated in a manner more fully described in U.S. Patent 2,587,391, entitled "Thermocouple," filed June 10, 1949 by John D. Seaver, issued February 26, 1952, and assigned to the same assignee as the present invention. Reference may also be made to that patent for a more complete description of the composition and connection of the thermocouple conductors 9 and 10.

The dissimilar metal thermocouple leads 9 and 10 extend beyond the core plug 16 and are welded at a thermocouple junction 21. The thermocouple junction 21 is located within an enclosure formed by the portion or extension 22 of the thermocouple sheath 7 and an end closure member 23 which may be formed as a part of the sheath or welded thereto. Since the extension 22 may conveniently be fabricated the same diameter as the housing 7, conventional thermocouple testing devices may be readily slipped over the extension and be in close contact to the housing. Diametrically opposed axial apertures 24 in the extension 22 enable the gas flow being measured, indicated by the arrow in FIG. 1, to pass therebetween and past the junction 21. The preferred configuration of the apertures 24 is shown in FIG. 2 in which the apertures extend in the axial direction and are substantially rectangular shaped with rounded ends. The axial openings 24 extend beyond the thermocouple junction 21 toward the end closure member 23.

The thermocouple 1 is installed in the usual manner by inserting it in the wall 2 of a chamber confining the combustion gas or gas flow to be tested. In a typical installation as shown in the drawing, a nut 17 having an internal annular flange which bears against the flange 8 of the thermocouple assembly is threaded over an externally threaded member 18 which is in turn welded to the chamber wall 2 in a gas-tight relation. Terminals 19 and 20 may be provided on the ends of the conductors in the cable 12 to provide appropriate connections to the thermocouple indicating and/or control circuit.

In operation, the electrical output of the thermocouple 1 across the leads 5 varies as a temperature of the junction 21 in a manner well known in the art. An exposed thermocouple junction has been considered to be the best method of obtaining fast response thermocouples such that the output across leads 5 will rapidly follow step changes in temperature occurring within the jet exhaust stream. In theory, such reasoning was based upon the fact that an exposed thermocouple junction has a low thermal mass and therefore is responsive primarily to the jet exhaust stream and is not extensively affected by the temperature of surrounding materials which may have a high thermal mass which may not respond quickly to rapid changes in the temperature of the gas stream. Also, enclosures may tend to reduce the mass flow of the gas stream across the thermocouple junction and thereby reduce the speed of response of the thermocouple. However, it has been found that the protected thermocouple described above has an extremely fast response time which under many circumstances exceeds that of an exposed thermocouple junction. Thus the thermocouple junction may be protected from foreign objects and handling damage while at the same time providing a response time equal to or better than that given by the same thermocouple junction directly exposed to the gas stream. While the exact reason for the surprising result obtained with the subject thermocouple is not exactly known, it is believed that a boundary layer or an atmosphere of relatively stationary gas collects around the thermocouple junction, even an exposed thermocouple junction, and that such boundary layers are not broken up by the relatively high velocity of the jet stream. As such, the boundary layer acts as an insulating or buffer layer to prevent the thermocouple junction temperature from instantly following the temperature of the jet exhaust stream passing by it. It is believed that the apertures 24 cause discontinuities to the jet stream flow in the region closely associated with thermocouple junction 21 such that gas flow turbulence or eddy currents are generated which break up or reduce the thickness of this boundary layer of atmosphere surrounding the thermocouple junction without appreciably reducing the mass flow past the junction and thus enables the junction to more rapidly follow the temperature changes of the jet exhaust stream. This effect is accomplished even in the presence of the relatively high thermal mass of the surrounding enclosure formed by the extension 22 in end closure member 23. It is felt that the turbulent gas has random velocity components in addition to the free stream velocity such that the stagnant air surrounding the thermocouple junction 21 is broken up. The end closure member 23 prevents the turbulence flow from dissipating through the bottom of the thermocouple sheath and in effect enhances the turbulence within the thermocouple junction enclosure.

A thermocouple such as that shown in FIGS. 1 and 2 which has proved to be quite satisfactory in operation included the following dimensions. The axial length of the aperture 24 along a plane passing through the leads 9 and 10 is .500 inch with the lower end of the junction 21 extending axially .250 inch below the upper end of the aperture. The distance between the lower end of the aperture and the bottom of end closure member 23 is .125 inch and the width of aperture 24 between axial edges 26 is .260 inch in a thermocouple housing .020 inch thick and having an outside diameter of .330 inch.

An alternate arrangement of the aperture 24 is shown in FIG. 3. Referring to FIG. 3, it will be seen that extensions or side members 25 extend substantially radially outward from the axis of the sheath 7 to act as a funnel or air scoop to divert a larger volume of the jet stream through the aperture 24 and thus increase the gas flow past the thermocouple junction 21. While auxiliary members could be fastened to the extension 22 of the sheath 7, it is convenient to utilize the material which would normally be removed from the extension to form the aperture. This may be conveniently accomplished by cutting along the rounded edges of the aperture 24 axially along the central region thereof and bending the tabs 25 back along the axial edges 26 shown in FIG. 2 such that the extensions 25 extend radially outward from the axis of the sheath 7.

FIG. 4 shows another modification of the arrangement shown in FIG. 2. A member 26 is fabricated as part of the extension 22 or welded thereon and extends axially from the bottom edge of the aperture 24 toward the region of the thermocouple junction 21. The member 26 assists in creating turbulent gas flow in the region of the thermocouple junction 21 and divides the aperture 24 such that particles which would otherwise pass through to damage the thermocouple junction are excluded. Alternatively, or in combination with the member 26, a bridging member 27 transverse thereto may be placed across the opening 24. It is apparent that the configuration of the opening 24 and of the additional members such as 26 and 27 may be varied. However, the aperture 24 must no be so obstructed that the net flow rate in the region of the thermocouple junction 21 is appreciably reduced or the effect on the speed of response of the thermocouple will more than offset the benefits gained from the increased gas stream turbulence.

Also, while the subject invention has been described in relation to a thermocouple utilized to detect changes in temperature in the exhaust stream of a jet engine, it is apparent that thermocouples constructed in accordance with the invention could be utilized to measure or control the temperature of other streams or materials. Also, the invention could be applied to other temperature responive devices.

Therefore, while particular embodiments of the subject invention have been shown and described herein, they are in the nature of description rather than limitation, and it will occur to those skilled in the art that various changes, modifications, and combinations may be made within the province of the appended claims without departing either in spirit or scope from this invention in its broader aspects.

What I claim as new and desire to secure by Letters Patent of the United States is:

1. A thermocouple for measuring the temperature of moving gaseous fluids comprising: a tubular sheath, a pair of thermocouple leads of dissimilar metals extending axially through said sheath and terminating in a thermocouple junction toward one end of the sheath, a core of insulating material in said housing separating said thermocouple leads from said sheath, said thermocouple junction extending beyond said insulating material, two diametrically opposed apertures in said thermocouple sheath proximate to said junction to enable the moving fluid being measured to pass directly through said sheath and past said junction, and an end closure member transverse to the axis of said sheath at said one end thereof closing the end and forming a chamber about said thermocouple junction in combination with said sheath, said apertures being shaped and positioned relative to said thermocouple junction such as to introduce turbulence flow into the moving fluid flowing past said junction, said apertures being of sufficiently large size and shape such that the net flow rate of the fluid in the region of the thermocouple junction will not be appreciably reduced from that of the thermocouple junction if it were not in said chamber, but was directly exposed to said moving fluid, the width of said apertures in a plane perpendicular to the axis of said sheath being a major portion of the diameter of the sheath.

2. A thermocouple for measurng the temperature of moving gaseous fluids comprising: a tubular sheath, a pair of thermocouple leads of dissimilar metals extending axially through said sheath and terminating in a thermocouple junction toward one end of the sheath, a core of insulating material in said housing separating said thermocouple leads from said sheath, said thermocouple junction extending beyond said insulating material, two diametrically opposed apertures in said thermocouple sheath proximate to said junction to enable the moving fluid being measured to pass directly through said sheath and past said junction, and an end closure member transverse to the axis of said sheath at said one end thereof closing the end and forming a chamber about said thermocouple junction, said apertures being substantially rectangular shaped with rounded ends and extending axially along said sheath and introducing turbulence flow into the moving fluid flowing past said junction, the width of said apertures in a plane perpendicular to the axis of said sheath being a major portion of the diameter of said sheath such that the net flow rate of the gaseous fluid in the region of the thermocouple junction will not be appreciably reduced from that of the thermocouple junction if it were not in said chamber, but was directly exposed to said moving fluid.

3. A thermocouple for measuring the temperature of moving gaseous fluids comprising: a tubular sheath of substantially uniform cross section closed at one end, a pair of thermocouple leads of dissimilar metals extending axially through said sheath and terminating in a thermocouple junction toward said one end of the sheath, a core of insulating material in said housing separating said thermocouple leads from said sheath, said thermocouple junction extending beyond said insulating material, and at least two diametrically opposed apertures in said thermocouple sheath proximate to said junction shaped and positioned so as to introduce turbulence flow into the moving fluid being measured by the junction, a portion of which fluid passes directly through said apertures and past said junction, the width of said apertures in a plane perpendicular to the axis of said sheath being a major portion of the diameter of said sheath and the length of said apertures in an axial direction being substantially twice said width, said apertures being of sufficient size and shape that the net flow rate of the gaseous fluid in the region of the thermocouple junction will not be appreciably reduced from that of an exposed thermocouple junction.

4. A thermocouple as defined in claim 1 wherein a member extends from the periphery of one of said apertures toward the central region thereof.

5. A thermocouple as defined in claim 3 wherein a member extends from the periphery of one of said apertures toward the central region thereof.

6. A thermocouple as defined in claim 1 wherein at least one member extends outwardly from the periphery of one of said apertures such as to act as a funnel to increase the volume of the moving fluid which will pass through said one aperture.

7. A thermocouple as defined in claim 3 wherein at least one member extends outwardly from the periphery of one of said apertures such as to act as a funnel to increase the volume of the moving fluid which will pass through said one aperture.

References Cited in the file of this patent

UNITED STATES PATENTS

| | | |
|---|---|---|
| 2,485,468 | Wrigley | Oct. 18, 1949 |
| 2,496,774 | Buck | Feb. 7, 1950 |
| 2,653,983 | Best | Sept. 29, 1953 |
| 2,870,233 | Comer | Jan. 20, 1959 |
| 2,888,508 | Rademacher | May 26, 1959 |
| 2,930,827 | Schunke | Mar. 29, 1960 |

FOREIGN PATENTS

| | | |
|---|---|---|
| 756,963 | Great Britain | Sept. 12, 1956 |
| 584,088 | Canada | Sept. 29, 1959 |

OTHER REFERENCES

Rohsenow et al.: Trans. A.S.M.E., volume 69, August 1947, pages 699–703.